(12) United States Patent
Chaiko

(10) Patent No.: US 6,172,121 B1
(45) Date of Patent: Jan. 9, 2001

(54) PROCESS FOR PREPARING ORGANOCLAYS FOR AQUEOUS AND POLAR-ORGANIC SYSTEMS

(75) Inventor: David J. Chaiko, Naperville, IL (US)

(73) Assignee: The University of Chicago, Chicago, IL (US)

( * ) Notice: Under 35 U.S.C. 154(b), the term of this patent shall be extended for 0 days.

(21) Appl. No.: 09/316,449

(22) Filed: May 21, 1999

(51) Int. Cl.$^7$ .............................. B01J 13/00; C04B 14/10; C08J 3/03; C08K 9/12
(52) U.S. Cl. ........................ 516/101; 106/487; 501/148; 507/901; 516/100; 524/445
(58) Field of Search ...................... 516/100, 101; 524/445; 106/487; 501/148; 507/901

(56) References Cited

U.S. PATENT DOCUMENTS

| | | | |
|---|---|---|---|
| 2,531,427 | * 11/1950 | Hauser | 516/100 X |
| 2,658,869 | * 11/1953 | Stross et al. | 516/100 X |
| 3,227,657 | * 1/1966 | Haden, Jr. et al. | 516/100 |
| 4,422,855 | * 12/1983 | Sawyer, Jr. | 516/101 X |
| 4,677,158 | 6/1987 | Tso et al. | 524/789 |
| 4,798,766 | * 1/1989 | Rice | 106/487 X |
| 4,855,268 | * 8/1989 | Raythatha | 501/148 X |
| 5,028,351 | * 7/1991 | Kato et al. | 516/101 |
| 5,110,501 | 5/1992 | Knudson, Jr. et al. | 501/148 X |
| 5,411,149 | 5/1995 | Chaiko et al. | 209/172.5 |
| 5,625,862 | 4/1997 | Chaiko et al. | 423/3 |
| 5,663,111 | 9/1997 | Gadberry et al. | 501/146 |
| 5,728,764 | 3/1998 | Bauer et al. | 524/451 |
| 5,830,528 | * 11/1998 | Beal et al. | 106/487 X |

FOREIGN PATENT DOCUMENTS

1146668 * 3/1969 (GB) ................................ 524/445

* cited by examiner

*Primary Examiner*—Richard D. Lovering
(74) *Attorney, Agent, or Firm*—Michael D. Rechtin; Foley & Lardner

(57) ABSTRACT

A process for preparing organoclays as thixotropic agents to control the rheology of water-based paints and other aqueous and polar-organic systems. The process relates to treating low-grade clay ores to achieve highly purified organoclays and/or to incorporate surface modifying agents onto the clay by adsorption and/or to produce highly dispersed organoclays without excessive grinding or high shear dispersion. The process involves the treatment of impure, or run-of-mine, clay using an aqueous biphasic extraction system to produce a highly dispersed clay, free of mineral impurities and with modified surface properties brought about by adsorption of the water-soluble polymers used in generating the aqueous biphasic extraction system. This invention purifies the clay to greater than 95%.

16 Claims, 6 Drawing Sheets

PLOT OF VISCOSITY AS A FUNCTION OF SHEAR FOR THE ORGANOCLAY PRODUCT OF EXAMPLE 1

PLOT OF VISCOSITY AS A FUNCTION OF TIME FOR THE ORGANOCLAY PRODUCT OF EXAMPLE 1

PLOT OF PARTICLE SIZE DISTRIBUTIONS FOR (a) CLAY IN THE POLYMER-RICH PHASE AND (b) CLACITE IN THE SALT-RICH PHASE

PROCESS FOR PREPARING ORGANOCLAYS FOR AQUEOUS AND POLAR-ORGANIC SYSTEMS

This invention was made with Government support under Contract No. W-31-109-ENG-38 awarded by the U.S. Department of Energy. The Government has certain rights in this invention.

FIELD OF THE INVENTION

The present invention relates to a process for preparing organoclays as thixotropic agents for water-based paints and other aqueous systems. More particularly, the invention relates to a process for treating clays to achieve high levels of purification and/or to incorporate surface modifying agents onto the clay by adsorption and/or to produce highly dispersed organoclays without excessive grinding or high shear dispersion.

BACKGROUND OF THE INVENTION

There is increased interest in water-based paints over oil-based paints for a variety of reasons, including ease of application as well as benefits to the environment. In recent years, there has been considerable pressure from state and federal agencies to reduce volatile organic compounds ("VOCs") in a number of consumer products, including paints, inks, and cosmetics. Hence, there is a substantial need for water-based rheological control agents.

In response to this need for water-based rheological control agents, some companies have begun to develop organoclays that are compatible with water-based gelling systems. Traditionally, organoclays have been prepared from an ion-exchange reaction between a cationic organic compound, which is usually a quaternary amine, and a smectite-type clay with an ion exchange capacity of at least 50 milliequivalents (meq.) weight (wt.) per 100 grams of clay.

Current water-base smectite-type clay systems typically involve surface modification of clays through reaction of alkoxylated quaternary ammonium salts at ion exchange sites to prepare thixotropic agents (as described in U.S. Pat. Nos. 5,663,111; 5,728,764; and 4,677,158) instead of adding traditional quaternary amines such as dimethyl di-hydrogenated tallow amine, and dimethyl hydrogenated tallow benzyl amine. In addition, these processes involve steps for purification and various ion exchange reactions carried out separately and sequentially at elevated temperatures, which adds considerable cost and complexity to the production of organoclays.

In conventional approaches, the steps involved in the process are carried out separately and sequentially, beginning with physical beneficiation of the clay, followed by conversion to a sodium form, and finally, preparation of the organoclay. Normally, the clay in the purified sodium form is separated from a process liquor, dried, and then crushed. The dried, pulverized clay is then repulped in an aqueous medium in preparation for conversion to the organoclay. Multiple drying steps in conventional processes add significantly to the cost of producing organoclays.

Current processes for preparing organoclays are expensive and involve a high content of VOCs used in the process. Furthermore, current approaches subject the clay slurry to high shear in order to disperse the clay and thereby reduce the average particle size of the clay. Combinations of multiple centrifugation steps with multiple, high-energy fluid shear steps are described in the literature. These processes are highly energy intensive and lead to rapid abrasion of processing equipment. An example from U.S. Pat. No. 5,110,501, which illustrates the particle size reduction achieved through high-speed fluid shear, involves the reduction in average particle size from 0.756 micrometers to 0.352 micrometers for a smectite clay with an energy input of 700 HP-hr/ton clay.

In addition, current methods of preparing organoclays that are compatible with water-based systems still rely on the attachment of a water-soluble onium cation onto the clay surface through an ion exchange reaction. This reliance on ion exchange means that the surface coverage of the clay by the organic modifying agent is limited by the number of ion exchange sites per unit area on the clay. Furthermore, once all of the ion exchange sites are occupied through attachment of an organic modifying agent, no further surface modification is possible.

It is therefore an object of the present invention to provide a novel method and apparatus for preparing organoclays for aqueous systems.

It is another object of this invention to provide a novel method for preparing organoclays that can be used to control the rheology of aqueous-based systems.

It is another object of this invention to provide a novel method for preparing organoclays for polar organic systems.

It is another object of this invention to provide a novel method for preparing organoclays for incorporation into polymeric systems as a nanocomposite.

It is another object of this invention to provide a novel method for treating low-grade clay ores to achieve high levels of purification.

It is another object of this invention to provide a novel method for incorporating surface modifying agents onto clay by adsorption through ion-dipole and hydrogen-bonding interactions rather than primary dependence on cation exchange.

It is another object of this invention to provide a novel method for producing highly dispersed organoclays without excessive grinding or high shear dispersion.

It is another object of this invention to provide a novel method for preparing consumer products using a reduced content of VOCs.

It is another object of this invention to provide a novel method for preparing organoclays at a reduced cost compared to current processes.

It is another object of this invention to provide a novel apparatus for preparing organoclays whereby the processing equipment has a prolonged life.

It is another object of this invention to provide a novel method for preparing organoclays having an average particle size of less than 0.2 micrometers using gentle stirring with a mechanical mixer at room temperature.

It is another object of this invention to provide a novel method for preparing organoclays using nonionic polymers for surface modification instead of reliance on ion exchange reactions.

It is another object of this invention to provide a novel method for preparing organoclays for use in foods, pharmaceuticals, cosmetics, and fire retardants.

It is another object of this invention to provide organoclays prepared by a novel method.

It is another object of this invention to provide aqueous compositions containing organoclays prepared by a novel method.

Other objects and advantages of the invention will become apparent by review of the detailed description of preferred embodiments.

SUMMARY OF THE INVENTION

The invention is directed to a process for preparing organoclays as thixotropic agents which can be used to control the rheology of aqueous-based systems, such as paints. More particularly, the invention relates to a process for treating low-grade clay ores to achieve high levels of purification and/or to incorporate surface modifying agents onto the clay by adsorption through ion-dipole and hydrogen-bonding interactions rather than primary dependence on cation exchange. In addition, this invention produces highly dispersed organoclays without the previous levels of grinding or high shear dispersion.

The process involves the treatment of impure or run-of-mine clay using an aqueous biphasic extraction system as described in U.S. Pat. Nos. 5,411,149 and 5,625,862, herein incorporated by reference. The aqueous biphasic extraction system simultaneously converts the clay to a sodium form, generates an organoclay, and separates the organoclay from mineral impurities present in the ore. The aqueous biphasic extraction system is used to produce a highly dispersed clay, free of mineral impurities, with modified surface properties brought about by adsorption of water-soluble polymers used in generating the aqueous biphasic extraction system. Such polymers include low-molecular-weight, water-miscible polymers such as polyethylene glycol, polypropylene glycol or their copolymers. Preferably, the adsorption occurs through contacting the clay with a polymer-rich phase of the aqueous biphasic extraction system. The process also allows the subsequent incorporation of additional modifying agents, such as quaternary ammonium salts, at ion exchange sites to achieve a desired hydrophilic/hydrophobic balance of properties in addition to other performance requirements. The process can be carried out in a limited number of steps using the aqueous biphasic extraction system to achieve a combination of purification, adsorption and one or more of the other benefits described herein.

One aspect of the invention involves surface modification of the clay with water-miscible, low-molecular-weight polymers which does not depend on surface density of ion exchange sites for attachment of the organic component. Rather the surface modification occurs through nonspecific entropy-driven effects and specific interactions between the polymer and the sodium-exchanged clay surface through ion-dipole interactions and hydrogen-bonding interactions between the polymer and silanol and siloxane sites. An advantage of this method lies in the fact that surface modification of the clay can be carried out simultaneously with separation of the clay from mineral impurities. In addition, because attachment of the organic component does not occur through an ion exchange reaction, conversion of the clay to an organoclay does not require preconversion of the clay to a sodium form. Thus, a number of intermediate steps required in conventional methods of preparing organoclays are combined into a single-step process.

This invention produced an average particle size of about 0.196 microns when gently stirred with a mechanical mixer at room temperature. Furthermore, this invention purified the clay to greater than about 95% in a single step.

In one embodiment of the invention, clay with impurities is dispersed in a polymer-rich phase of an aqueous biphasic extraction system with a resultant polymer-rich phase containing clay, then being contacted with an aqueous salt solution. The resultant clay also includes a level of low-molecular-weight, water-miscible polymer, such as polyethylene glycol, adsorbed from polymers present in the polymer-rich phase. The liquid phases are separated whereby any mineral impurities and nonexchanged clays are carried with a salt-rich phase while the dispersed organoclay is carried with the polymer-rich phase. Treatment with the salt solution results in the sodium exchange of the clay. Alkoxylated quaternary ammonium salts can be incorporated into the clay by ion exchange with the sodium.

Alternatively, the polymer-rich phase of an aqueous biphasic extraction system can contain a mixture of two or more polymers, one of which is present at a concentration sufficient to generate the aqueous biphasic extraction system without contribution from the other polymer(s) present. This approach permits surface modification of a smectite clay by a polymer that, by itself, would not produce a usable aqueous biphasic extraction system.

The disclosed process enables preparation of organoclays displaying excellent thixotropic properties and having an organic content of 20–30 wt % or less wherein the organic modifier is firmly attached to the surface of the clay and cannot be removed by washing with water. In contrast, current water-based gelling systems described in the literature typically contain an organic content of 40–50 wt % and can consist of a physical mixture containing clay and a water-soluble polymer. The low organic content in the disclosed process significantly reduces the cost of preparing the organoclay.

The invention also includes organoclays resulting from the novel process, wherein modifying agents are adsorbed and are added at ion exchange sites as a means to provide organoclays custom-tailored to specific applications. A further aspect of the invention includes aqueous compositions containing the organoclays resulting from the novel process.

With further surface modification, the water-based organoclays can be used in polar-organic systems such as low-molecular-weight alcohols and alcohol/water mixtures. These materials possess unique surface properties that make them especially useful in the manufacture of nanocomposites in which the organoclay is dispersed as an exfoliate in thermoplastic or thermosetting polymers. The ability of conventional organoclays to be fashioned into nanocomposites, as exemplified in U.S. Pat. Nos. 4,889,885 and 5,552,469, and described by Tie Lan et al., "Mechanism of Clay Tactoid Exfoliation in Epoxy-Clay Nanocomposites," Chem. Mater. 7, 2144–2150 (1995) depends on the interlayer spacing of the organoclay and requires an interlayer spacing of 30 Angstrom or greater. The modified organoclays described in this invention with an interlayer spacing of 30 Angstrom or less can be used to prepare nanocomposites.

The above described objects and embodiments are set forth in the following description and illustrated in the drawings described hereinbelow.

DETAILED DESCRIPTION OF THE PREFERRED EMBODIMENTS

Figure 1:
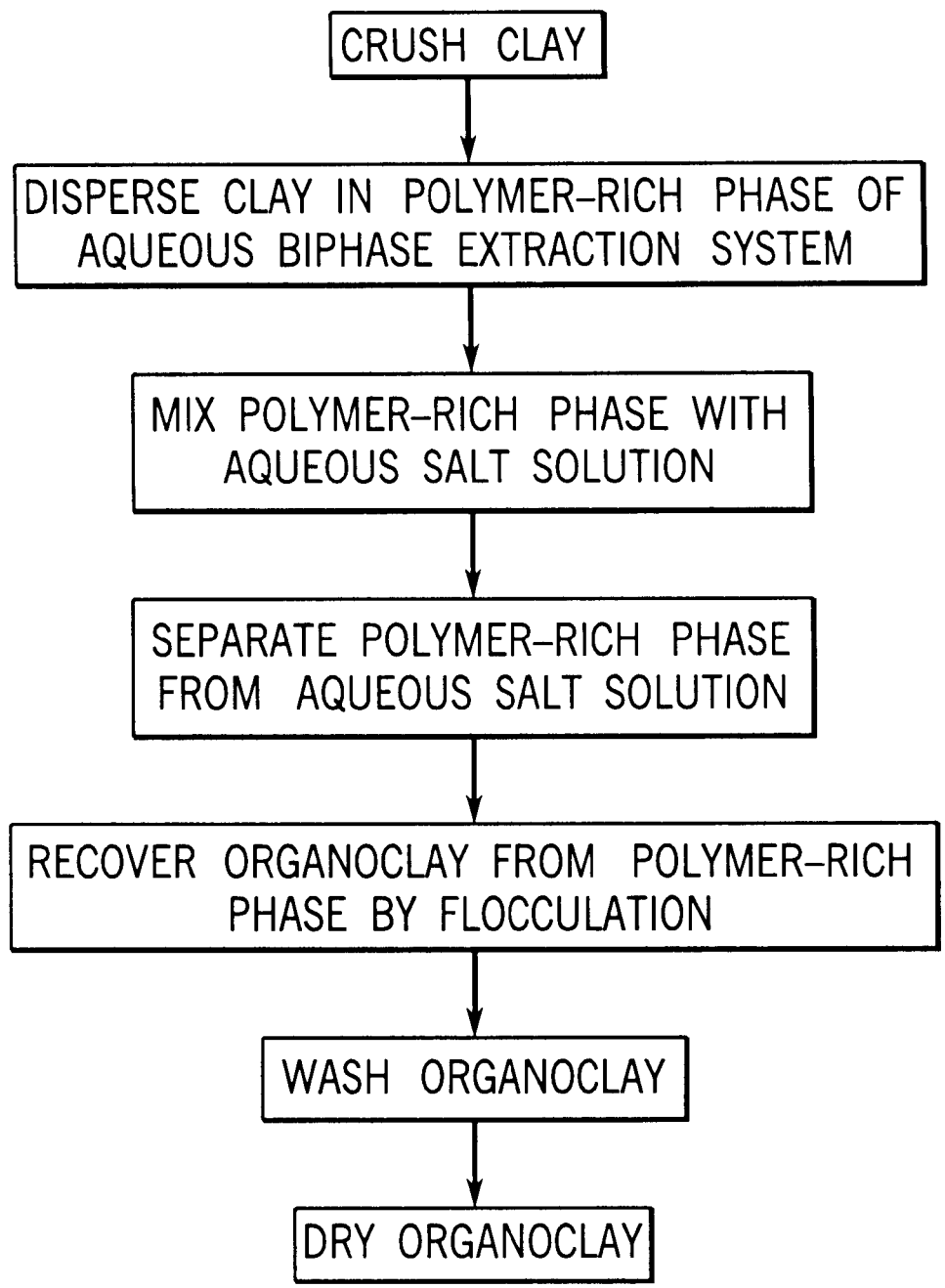
FIG. 1 illustrates a process for preparing organoclays for aqueous systems in accordance with one aspect of the invention.

Referring to FIG. 1, a process for preparing organoclays for aqueous systems in accordance with one found in the invention is shown via a flow diagram. In this embodiment for the preparation of organoclays, run-of-mine clays are treated using an aqueous biphasic extraction system to (1) produce highly purified organoclays directly from low-grade clay ores, (2) modify surface properties of clay through adsorption of low-molecular-weight, water-miscible polymers, such as polyethylene glycol or polypropylene glycol, or their copolymers, and (3) produce highly dispersed organoclays without extensive grinding or high shear dispersion.

The aqueous biphasic extraction system is used to simultaneously convert clay to a sodium form, generate an organoclay, and separate the clay from mineral impurities present in the ore. The impurities may include: non-clay silicates (e.g., quartz, cristobalite, opal, talc, mica, forsterite, garnet, willemite, wollastonite, cummingtonite, spodumene, beryl), metal hydroxides (e.g., gibbsite, brucite, etc.), carbonates (e.g., calcite, aragonite, dolomite, etc.), sulfates (e.g., gypsum, alunite, barite, etc.), and phosphates (e.g., all minerals of the apatite group). Preferably, the clay is purified to greater than 95%.

Surface properties of the clay can be further modified after the clay is recovered from the aqueous biphasic extraction system through the use of additional, low-molecular-weight polymers, such as polypropylene glycol, monomethoxypolyethylene glycol, dimethoxypolyethylene glycol, copolymers of polyethylene glycol/polypropylene glycol, or polyethylene glycol/polypropylene glycol/polybutylene glycol, nonionic surfactants, including ethoxylated alcohols, alkylaryl polyether alcohols, exemplified by the surfactants marketed by Union Carbide Corporation under the Tergitol® and Triton® designations, respectively, and cationic surfactants, typified by amine-type surfactants. Through this further modification, a hydrophilic/hydrophobic balance (HLB) of the organoclay can be modified to produce thixotropes with improved efficiency and dispersability in aqueous-based systems and polar-organic systems.

Polymer mixtures can also be used to generate the aqueous biphasic extraction system. Examples of polymer mixtures that may be used include 95–99 wt % polyethylene glycol and 1–5 wt % of another water-soluble polymer such as polyvinyl alcohol, polyvinylpyrrolidone, and polyethylene glycol derivatives such as polyethylene glycol acrylate, polyethylene glycol diacrylate, polyethylene glycol methyl ether acrylate, polyethylene glycol methacrylate, polyethylene glycol dimethacrylate, polyethylene glycol methyl ether methacrylate, polyethylene glycol methyl ether epoxide, polyethylene glycol diglycidyl ether, polyethylene glycol phenyl ether acrylate, polyethylene glycol bisphenol A diglycidyl ether, polyethylene glycol dibenzoate, polyethylene glycol bis(3-aminopropyl), polyethylene glycol butyl ether, polyethylene glycol dicarboxymethyl ether, polyethylene glycol divinyl ether.

Thixotropic properties of organoclays produced from the reaction of smectite-type clays with the low-molecular-weight polymers described herein make these organoclays useful as rheological control agents in a wide range of water-based products including inks, paints, coatings, cosmetics, lubricants, caulks, pharmaceuticals, fertilizers, pesticides, oil drilling muds, lubricating greases, binders, and adhesives. Smectite clays normally used in preparing organoclays include hectorite, saponite, montmorillonite, beidellite, nontronite, and stevensite, all of which are compatible with the present invention.

The preferred process involves the following preferred steps:

1. Crushing run-of-mine clay to less than 100 mesh and gently dispersing the raw clay in a polymer-rich phase of an aqueous biphasic extraction system at a solids concentration sufficient to provide a smectite-clay concentration of between 2 and 6 wt % in the polymer-rich phase of the aqueous biphasic extraction system.

2. Contacting the polymer-rich phase containing dispersed clay ore with an aqueous salt solution such as sodium carbonate, sodium sulfate, or sodium phosphate. Treatment with the salt solution results in sodium being added at ion exchanges. The components are mixed gently at room temperature. Elevated temperatures may also be used to speed clay dispersion, water swelling, and ion exchange processes.

3. Separating liquid phases from each other, whereby mineral impurities are carried with a salt-rich liquid phase, while the sodium-exchanged organoclay is carried with the polymer-rich liquid phase. The resultant clay also includes a level of low-molecular-weight, water-miscible polymers such as polyethylene glycol, polyvinylpyrrolidone and polyvinylalcohol, adsorbed from polymers present in the polymer-rich phase.

4. Recovering the organoclay from the polymer-rich liquid phase by flocculation with an appropriate, high-molecular-weight polymer. Types of polymers appropriate for the flocculation of the organoclay are those normally used in mineral processing for solid/liquid separation of clay systems and can be nonionic, cationic, or anionic polymers with molecular weights in a range between about 1 million and 5 million.

5. Washing the organoclay to remove excess polymer and drying at a temperature low enough to avoid excessive oxidation of a polymeric surface coating on the clay. Avoidance of excessive oxidation typically requires drying temperatures at or below 100° C. Drying time can be reduced significantly by further modifying surface properties of the organoclay with low-molecular-weight polymers that increase hydrophobicity of the clay. Examples of such polymers include, but are not limited to, polypropylene glycol, copolymers of polyethylene glycol/polypropylene glycol, or polyethylene glycol/polypropylene glycol/polybutylene glycol. The organoclay surface can also be modified to improve drying by partial conversion of the ion exchange sites with onium ions containing hydrophobic alkyl groups.

While crushing the run-of-mine ore to a maximum particle size of 100 mesh is normally sufficient for efficient operation of the aqueous biphasic extraction system, reduction to finer particle sizes may be required to obtain sufficient liberation of gangue minerals from the clay. Grinding requirements are thus determined by the nature of the ore and are made on a case-by-case basis.

The clay feed is mixed with the polymer-rich phase of the aqueous biphasic extraction system for a sufficient length of time to complete: (1) conversion of the clay to the sodium form, (2) dispersion of the clay, and (3) modification of the surface properties of the clay through polymer attachment. These processes will normally take from 30 to 60 minutes at room temperature. The time required to complete these processes can be shortened by heating the polymer-rich phase to 40–60° C. and crushing the clay feed to a smaller particle size. The optimum solids concentration in step 1 is determined by matching the sodium exchange requirements with the concentration of sodium present in the polymer-rich phase, which in turn, is determined by the phase diagram of the aqueous biphasic extraction system and choice of operating tie line. Once the clay is dispersed and sodium exchanged, the clay concentration can be reduced by diluting with additional polymer-rich phase.

An advantage of the disclosed process is that the clays produced through the aqueous biphasic extraction system possess a significantly smaller average particle size than those produced through traditional mineral processing techniques involving screens, hydrocyclones, and centrifuges. This significantly smaller average particle size occurs by virtue of the fact that the polymers used in generating the aqueous biphasic extraction system also aid in dispersing the clay using only gentle stirring, in contrast to current approaches which subject the clay slurry to high shear in order to disperse the clay and thereby reduce the average particle size of the clay. The present invention produces organoclay slurries having a small average particle size, for example 0.196 micrometers, using only gentle stirring with a mechanical mixer at room temperature. The gentle stirring enables processing equipment to maintain a relatively long life span compared to highly energy intensive processes that lead to rapid abrasion of processing equipment.

The following non-limiting examples serve to further illustrate advantages of the disclosed approach.

EXAMPLE 1

Figure 2:
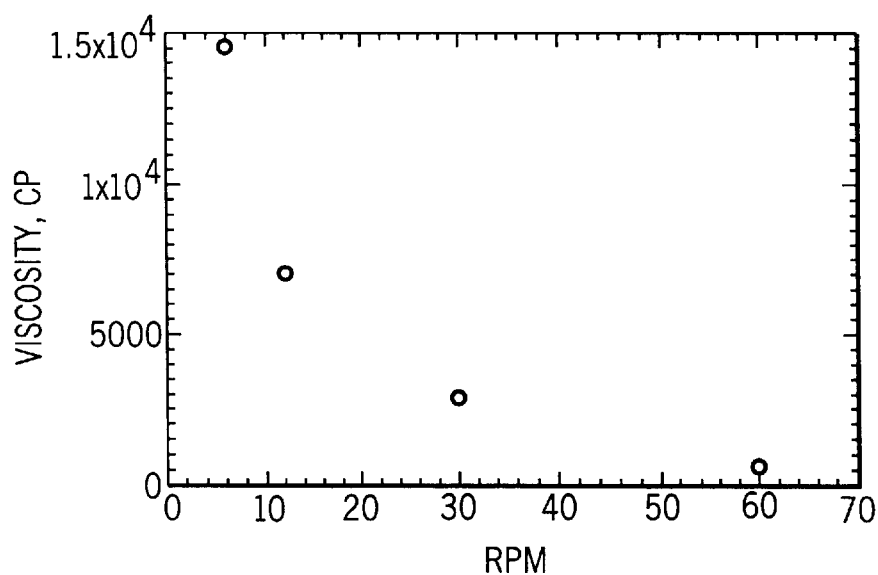
FIG. 2 is a plot of viscosity as a function of shear for an organoclay product as described in Example 1.

A mineral feed containing a mixture of smectite clays was purified using an aqueous biphasic extraction flowsheet as described in FIG. 2 of U.S. Pat. No. 5,411,149. The clay feed consisted of approximately 38 wt % mixed smectite clays in calcium form, together with 58 wt % calcite and 4 wt % quartz. Prior to dispersion of the ore in the polymer-rich phase of the aqueous biphasic extraction system, the ore was ground to minus 100 mesh. The suspension was agitated gently at room temperature for 60 minutes and then contacted with the salt-rich phase to generate an aqueous biphase system.

During equilibration of the liquid phases, the calcite and quartz were separated from the smectite clays by partitioning into the salt-rich phase while the clays, having been converted to the sodium form and containing a polymeric surface coating, remained in the polymer-rich phase. After liquid/liquid phase separation, the organoclay was recovered from the polymer-rich phase by flocculation with a commercial flocculant consisting of a high-molecular-weight polyacrylamide dispersed in water. The clay was then washed with deionized water to remove excess polymer and salt originating from the polymer-rich phase of the aqueous biphasic extraction system. The composition of the organoclay product (on an organic-free and moisture-free basis) was approximately 92.4 wt % clay, 4.5 wt % calcite, and 2.2 wt % salt originating from the salt used in the formation of the aqueous biphasic extraction system. The concentration of quartz in the product was below detection by X-ray diffraction. In addition, the weight ratio of calcium to inorganic carbon was 3.333 indicating that all of the calcium present in the organoclay was in the form of calcite and that the clay had been completely converted to the sodium form. Further analysis of the organoclay revealed that the organic content of the organoclay product was 27.7 wt %. Typical organic content of conventional organoclays produced through ion exchange attachment of the organic compound is in the range of 40–50 wt %. Of the original clay content in the ore, approximately 21 wt % was recovered in the organoclay product.

Figure 3:
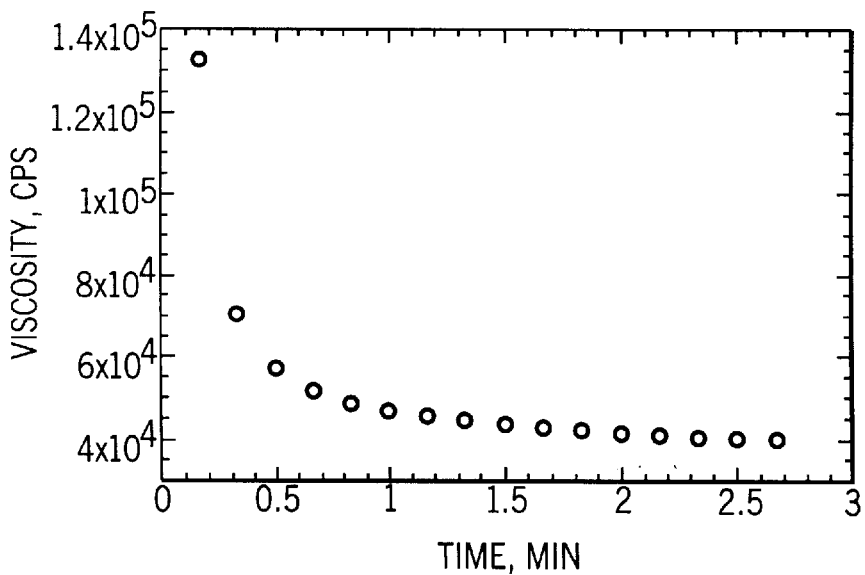
FIG. 3 is a plot of viscosity as a function of time for an organoclay product as described in Example 1.

To assess the rheological properties of aqueous dispersions of the organoclay product, the particle size distribution and the viscosities as a function of shear rate and time were measured. The organoclay dispersion was prepared by mixing 22.5 grams of dry organoclay with 350 grams deionized water in a blender at 11,000 rpm for 15 minutes. The average particle size, as measured by photon correlation spectroscopy, was found to be 0.380 micrometers. The viscosity of the organoclay dispersion was measured as a function of shear 12 hours after preparation using a Brookfield LVT viscometer and a number 3 spindle at 22.0° C. The results are shown in FIG. 2 and illustrate a decline in viscosity with increasing shear, which is characteristic of a shear-thinning suspension. The suspension was then allowed to sit for several days whereupon the viscosity of the suspension increased dramatically. Five days after preparation, the viscosity as a function of time was measured using a T-F spindle at 6 rpm and 22.0° C. The results are shown in FIG. 3 and illustrate a decline in viscosity as a function of time, which is characteristic of a thixotropic suspension.

EXAMPLE 2

A relationship between particle size distribution of the clay feed to the aqueous biphasic extraction system and the extent of clay recovery in the organoclay product is illustrated by comparing the clay recovery of 21 wt % in Example 1 with that obtained when the clay ore is ground considerably finer. In this example, the clay ore used in Example 1 was ground to minus 325 mesh in a ceramic ball mill after having been dispersed in the polymer-rich phase of the aqueous biphasic extraction system. Except for the additional grinding step, the organoclay was prepared in the same manner as in Example 1. This time, however, the clay recovery from the ore was approximately 80 wt %.

Figure 4:
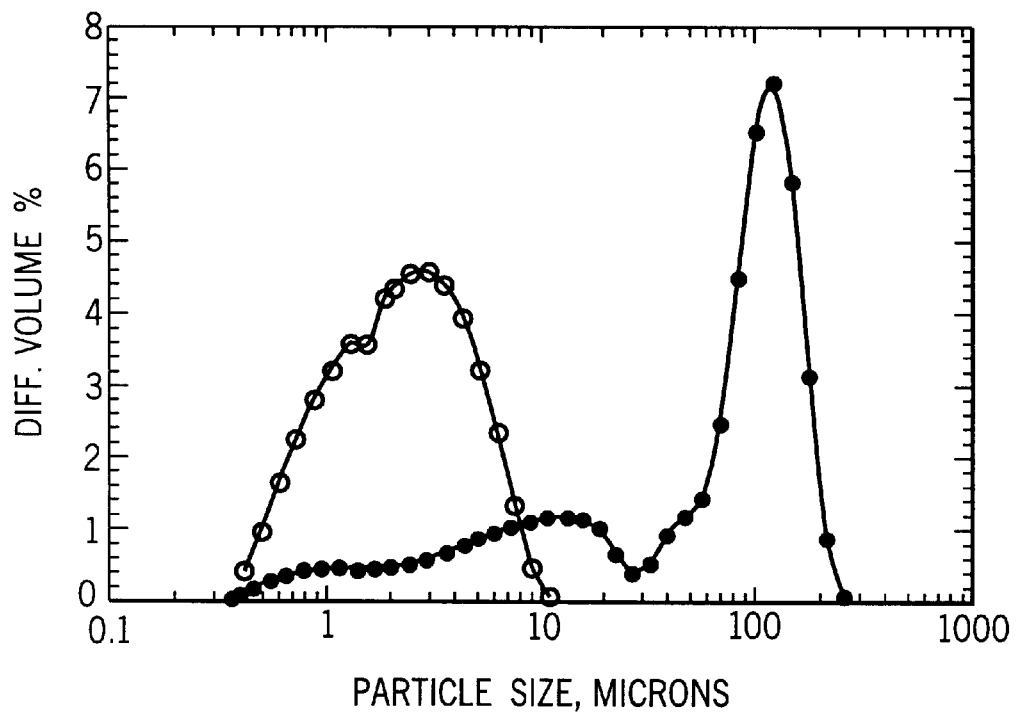
FIG. 4 is a plot of particle size distributions for clay in a polymer-rich phase and calcite in a salt-rich phase of an aqueous biphasic extraction system, as described in Example 2.

In FIG. 4, particle size distribution measurements for the polymer-rich and salt-rich phases of the aqueous biphasic extraction system show that calcite particle sizes extend below 1 micron, overlapping the upper size region of the smectite clays in the polymer-rich phase. The minus 5 micrometer calcite particles in the salt-rich phase were distinguished from clay particles by the fact that the milky white suspension (previously filtered through a 5 micrometer filter) immediately turned colorless and transparent upon acidification to pH 5 with hydrochloric acid.

This example illustrates the beneficial impact of fine grinding with regard to clay liberation from gangue minerals in the ore and the resulting improvement in clay recovery in the organoclay product. This example also illustrates that the disclosed process is capable of producing a highly purified organoclay even when the clay and the gangue minerals have overlapping size distributions. This capability is beyond that of conventional, physical processes in which separations are based on particle size. An example of such a technique used in the commercial preparation of organoclays is high-speed centrifugation.

EXAMPLE 3

This example illustrates the flexibility of the disclosed process whereby an organoclay product, as prepared in Example 1, can be further processed to make adjustments in the surface HLB value (as indicated by the contact angle) of the organoclay surface. The purified organoclay prepared in Example 1 was flocculated and washed with water to remove excess salt and polymer. The organoclay was resuspended in deionized water at a solids concentration of about 2 wt % by agitation with a mechanical mixer under low shear conditions. A quaternary amine, cetyl trimethylammonium bromide, was added slowly to the agitated dispersion until a final concentration of 0.01 wt % was reached. The modified organoclay was recovered by filtration and dried at 90° C. This produced a friable material that was easily pulverized to a fine, free flowing powder.

This example illustrates the capability of the disclosed process for varying the HLB values of the organoclay products by reacting the original organoclay product with reagents that are more hydrophobic than the polymers used in the aqueous biphasic extraction system. It also illustrates a method of surface modification which does not risk cross-contamination of the surface modifier into the aqueous biphasic extraction process solutions. Thus, one production line can be used to generate organoclay precursors that can be later modified into a wide range of products meeting the needs of various end users. The quaternary amine in this example was used to show that the described process is compatible with conventional reagents used in organoclay preparation and that surface coverage by a nonionic polymer does not preclude further surface modification through an ion exchange mechanism.

EXAMPLE 4

This example illustrates the surface modification of the organoclay prepared in Example 1, using the nonionic modifier, Triton X-45 (a trademark of Union Carbide Corporation). The purified organoclay prepared in Example 1 was flocculated and washed with water to remove excess polymer. The organoclay was resuspended in water at a solids concentration of about 3 wt % by agitation with a mechanical mixer under low shear conditions. A 10 wt % aqueous solution of Triton X-45 was added slowly, with mixing to the organoclay suspension at room temperature. The total amount of Triton X-45 added was 20 wt % of the clay bringing the total organic content of the organoclay to about 47 wt %. The organoclay was separated from the aqueous phase by centrifugation and dried at 110° C.

Samples of organoclays prepared in Examples 1, 3, and 4 were ground in an analytical mill and pressed into pellets. To illustrate the difference in surface properties between the two procedures, and as an indication of surface hydrophobicity, the contact angles of water were measured at the air/solid/water interface. The organoclay prepared in Example 1 displayed a contact angle of 0° indicating that water wets the hydrophilic organoclay. The organoclay prepared in Example 3 displayed a contact angle greater than 90°, indicating that the surface of this organoclay is highly hydrophobic. On the other hand, the organoclay prepared in Example 4, displayed a contact angle slightly greater than 0°, indicating that the modified organoclay surface is weakly hydrophobic.

EXAMPLE 5

Figure 5:
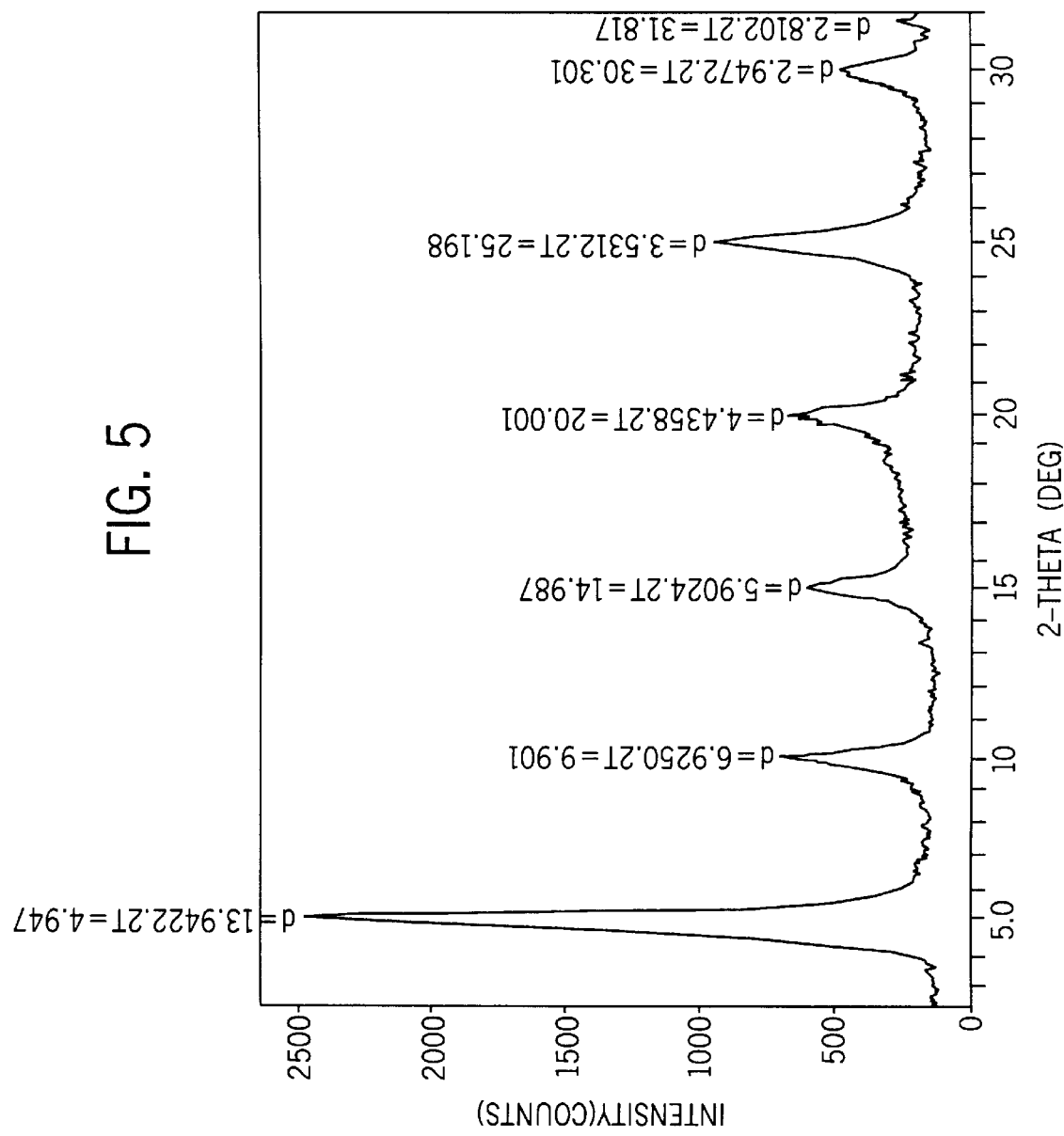
FIG. 5 is an X-ray diffraction pattern for an oriented sample consisting of sodium montmorillonite surface modified through the aqueous biphasic extraction process with polyethylene glycol having an average molecular weight of 1500 and hexylamine hydrochloride.

This example illustrates the uniqueness of the products produced by the disclosed process. An organoclay product, as prepared in Example 1, was flocculated and washed with water to remove excess polymer and salt. The organoclay was dried at 90° C. and pulverized. X-ray measurements indicated that the clay-polymer complex had an interlayer spacing, or d(001) value, of 17.8 Angstrom. This is a typical d(001) value for clay-polyethylene glycol complexes containing a monolayer coating of polymer on each clay platelet surface. The organoclay was further modified by resuspending in deionized water at a clay concentration of about 2 wt % and treating with an excess amount of quaternary amine at 70° C. Unexchanged quaternary ammonium salts were removed by washing the clay with deionized water followed by a 50:50 mixture of water/ethanol. Treating the organoclays with quaternary amines, such as cetyl trimethylammonium bromide, didecyldimethylammonium bromide, propylamine hydrochloride, hexylamine hydrochloride, octylamine hydrochloride, diethanolamine hydrochloride, and diisopropylamine hydrochloride, produces materials that retain the d(001) values of 17.8 Angstrom but which possess variable surface HLB values making them dispersible in a wide range of polar organics and organic/water mixtures. For example, a hydrophilic organoclay produced as described in Example 1 was further modified with diethanolamine hydrochloride and found to be dispersible in water, water/1,2-propanediol mixtures, and propanol/water mixtures containing up to about 20–30 wt % propanol. On the other hand, a hydrophilic organoclay produced as described in Example 1 which was further modified with didecyldimethylammonium bromide was no longer dispersible in water but was found to be dispersible in propanol/water mixtures containing approximately 35–90 wt % propanol. The hydrophilic organoclay modified with didecyldimethylammonium bromide was also dispersible in alcohol esters such as Texanol® (2,2,4-trimethyl-1,3-pentanediol monoisobutyrate) and ethers such as 2-phenoxyethanol. The X-ray pattern for an oriented organoclay sample modified with hexylamine hydrochloride is shown in FIG. 5. This material displays an interlayer spacing that is typical of clay/polyethylene glycol intercalates but because of the quaternary amine modification it is not dispersible in water.

EXAMPLE 6

Figure 6:
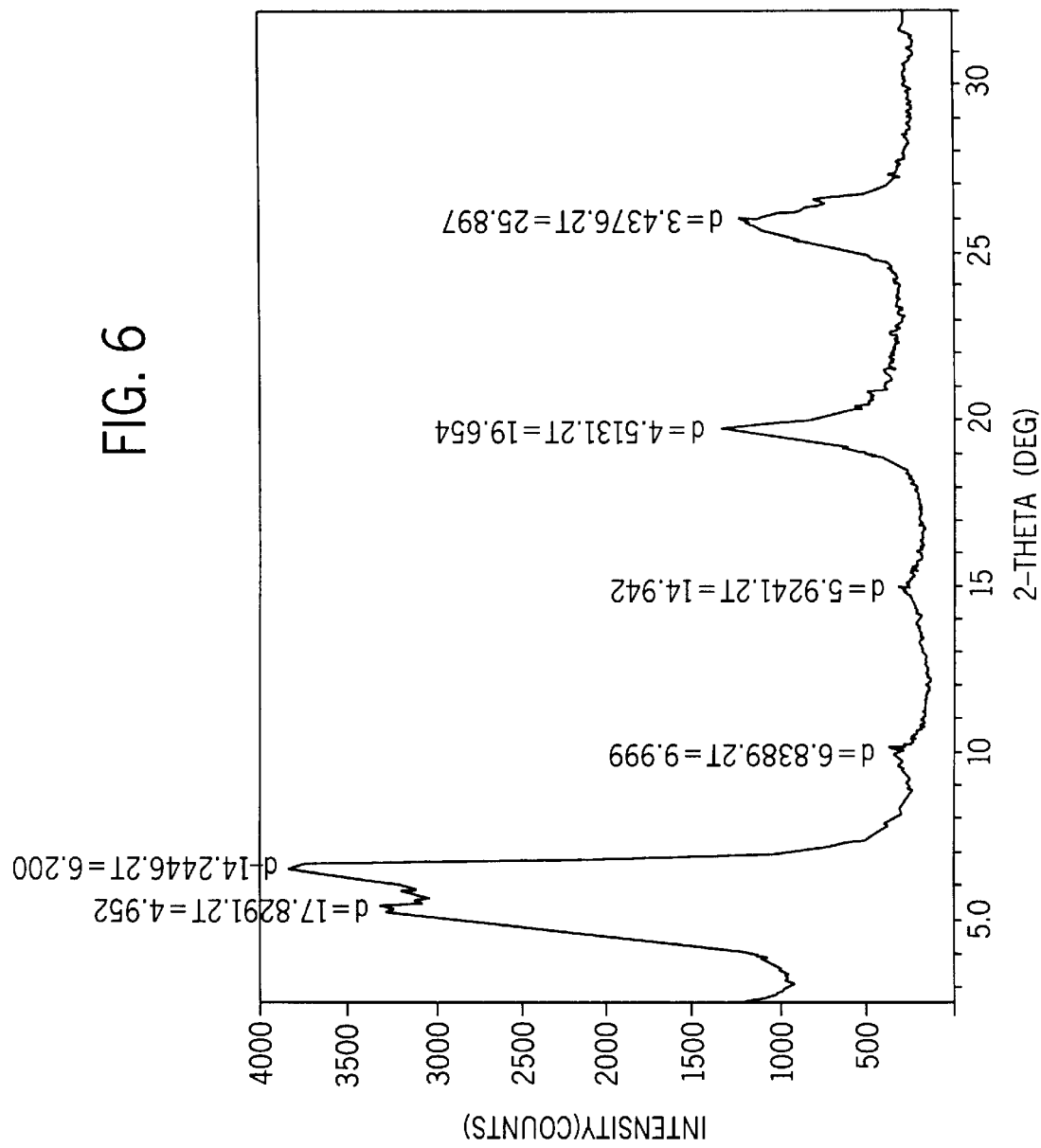
FIG. 6 is an X-ray diffraction pattern displaying the presence of two distinct surface-modified montmorillonite phases with d(001) spacings of 17.8 and 14.4 Angstrom, respectively, and produced by stoichiometric reaction with polyethylene glycol having an average molecular weight of 1500 followed by exchange with hexylamine hydrochloride.

This example illustrates the unique properties of the organoclays produced through the aqueous biphasic extraction process. As discussed in Example 4, smectite clays that are purified through the aqueous biphasic extraction process contain a single clay phase displaying d(001) values of 17.8 Angstrom even when further modified by ion exchange with onium salts. In this example, a sodium montmorillonite that had been purified by conventional size separation and sodium exchanged by contact with an ion exchange resin in the sodium form was dispersed in deionized water at a clay concentration of approximately 2 wt %. A stoichiometric amount of polyethylene glycol was added to the clay dispersion to produce a hydrophilic organoclay with the composition 0.27 g polyethylene glycol/g clay. The organoclay was then further modified with hexylamine hydrochloride at a concentration equal to 50% of the ion exchange capacity of the clay. The modified organoclay was separated from the aqueous phase by centrifugation and washed with water to remove sodium chloride produced during the onium ion exchange and any unreacted hexylamine hydrochloride. The material was dried at 110° C. The powder X-ray diffraction pattern shown in FIG. 6 indicates the presence of two distinct intercalated clay phases with d(001) spacings of 17.8 and 14.4 Angstrom, respectively. As described in J. Wu and M. M. Lerner, Structural, Thermal, and Electrical Characterization of Layered Nanocomposites Derived from Na-Montmorillonite and Polyethers, Chem. Mater., 5, 835–838 (1993), the 17.8 Angstrom phase corresponds to a polymer bilayer within the montmorillonite galleries while the 14.4 Angstrom phase corresponds to a polymer monolayer within the montmorillonite galleries. It was observed that the modified organoclay possessing the bilayer structure was dispersible in 1-propanol/water mixtures while the monolayer phase was not dispersible in either water or 1-propanol/water mixtures.

EXAMPLE 7

This example illustrates the use of an aqueous biphasic extraction system prepared with a mixture of polymers. A crude montmorillonite ore containing approximately 15 wt % calcite and 5 wt % quartz was purified and sodium exchanged using an aqueous biphasic extraction flowsheet as described in FIG. 2 of U.S. Pat. No. 5,411,149 except that the polymer-rich phase contained a mixture of polyethylene glycol with an average molecular weight of 1500 and polyvinylpyrrolidone with an average molecular weight of 24,000. The polyvinylpyrrolidone represented approximately 2 wt % of the total polymer used in generating the aqueous biphasic extraction system. The purified clay was recovered from the polymer-rich phase by flocculation with a high-molecular-weight polymeric flocculant, dried at 110° C. and pulverized. The powder X-ray diffraction pattern indicated a single clay/polymer phase with a d(001) spacing of 23 Angstrom which is characteristic of an intercalated polyvinylpyrrolidone bilayer (see C. W. Francis, Adsorption of polyvinylpyrrolidone on reference clay minerals, Soil Science, 115 40–54 (1973) and B. K. G. Theng, "Formation and Properties of Clay-Polymer Complexes" Elsevier Scientific Publishing Company, New York p. 89, 1979).

EXAMPLE 8

This example further illustrates the use of an aqueous biphasic extraction system prepared with a mixture of polymers. A crude montmorillonite ore containing approximately 15 wt % calcite and 5 wt % quartz was purified and sodium exchanged using an aqueous biphasic extraction flowsheet as described in FIG. 2 incorporated by reference of U.S. Pat. No. 5,411,149, except that the polymer-rich phase contained a mixture of polyethylene glycol with an average molecular weight of 1500 and 88% hydrolyzed polyvinyl alcohol with an average molecular weight of 10,000. The polyvinyl alcohol represented approximately 1 wt % of the total polymer used in generating the aqueous biphasic extraction system. The purified clay was recovered from the polymer-rich phase by flocculation with a high-molecular-weight polymeric flocculant, dried at 110° C. and pulverized. The powder X-ray diffraction pattern indicated a single clay/polymer phase with a d(001) spacing of 23 Angstrom which is characteristic of an intercalated polyvinyl alcohol bilayer (see D. J. Greenland, Adsorption of Polyvinyl Alcohols by Montmorillonite, J. Colloid Science 18, 647–664 (1963).

EXAMPLE 9

This example serves to illustrate the ability of the aqueous biphasic extraction process to selectively separate and recover sodium exchanged clays containing an intercalated polymer bilayer. A crude calcium saponite ore containing dolomite and quartz as the major impurities with a minor amount of calcite was purified using an aqueous biphasic extraction flowsheet as described in FIG. 2 of U.S. Pat. No. 5,411,149. The solids from the polymer-rich and salt-rich phases of the aqueous biphasic extraction system were recovered by flocculation with a high-molecular-weight polymeric flocculant and washed with water to remove excess polymer and salt. The solids were dried at 110° C., pulverized, and analyzed by powder X-ray diffraction. The X-ray pattern of the feed contained a d(001) spacing of 14.2 Angstrom while the material that was recovered from the salt-rich phase contained a clay d(001) spacing of 14.9 Angstrom and all of the characteristic diffraction peaks for dolomite, calcite, and quartz. The X-ray pattern of the purified clay recovered from the polymer-rich phase contained a clay d(001) spacing of 17.8 Angstrom.

EXAMPLE 10

This example illustrates the excellent rheological properties of the water-based organoclays disclosed in the present invention. A hydrophilic organoclay produced as described in Example 1 was used to prepare a latex paint having the following composition.

| Material | Wt % |
| --- | --- |
| Grind | |
| Ti-PURE ® R-942 | 20 |
| Anti Terra U | 0.6 |
| Organoclay | 0.41 |
| Water | 9.6 |
| Imsil ® A-15 | 15.3 |
| Triton ® X-100 | 0.1 |
| NOPCO NDW ® | 0.15 |
| Let Down | |
| UCAR ® latex 123 | 5.1 |
| Texanol ® | 0.6 |
| NOPCO NDW ® | 0.2 |
| Propylene glycol | 2.0 |

Note that the following trademarks are registered to: Ti-Pure (DuPont); Imsil (Unimin); Triton (Union Carbide); NOPCO NDW (Henkel); UCAR (Union Carbide); Texanol (Eastman Chem.)

Figure 7:
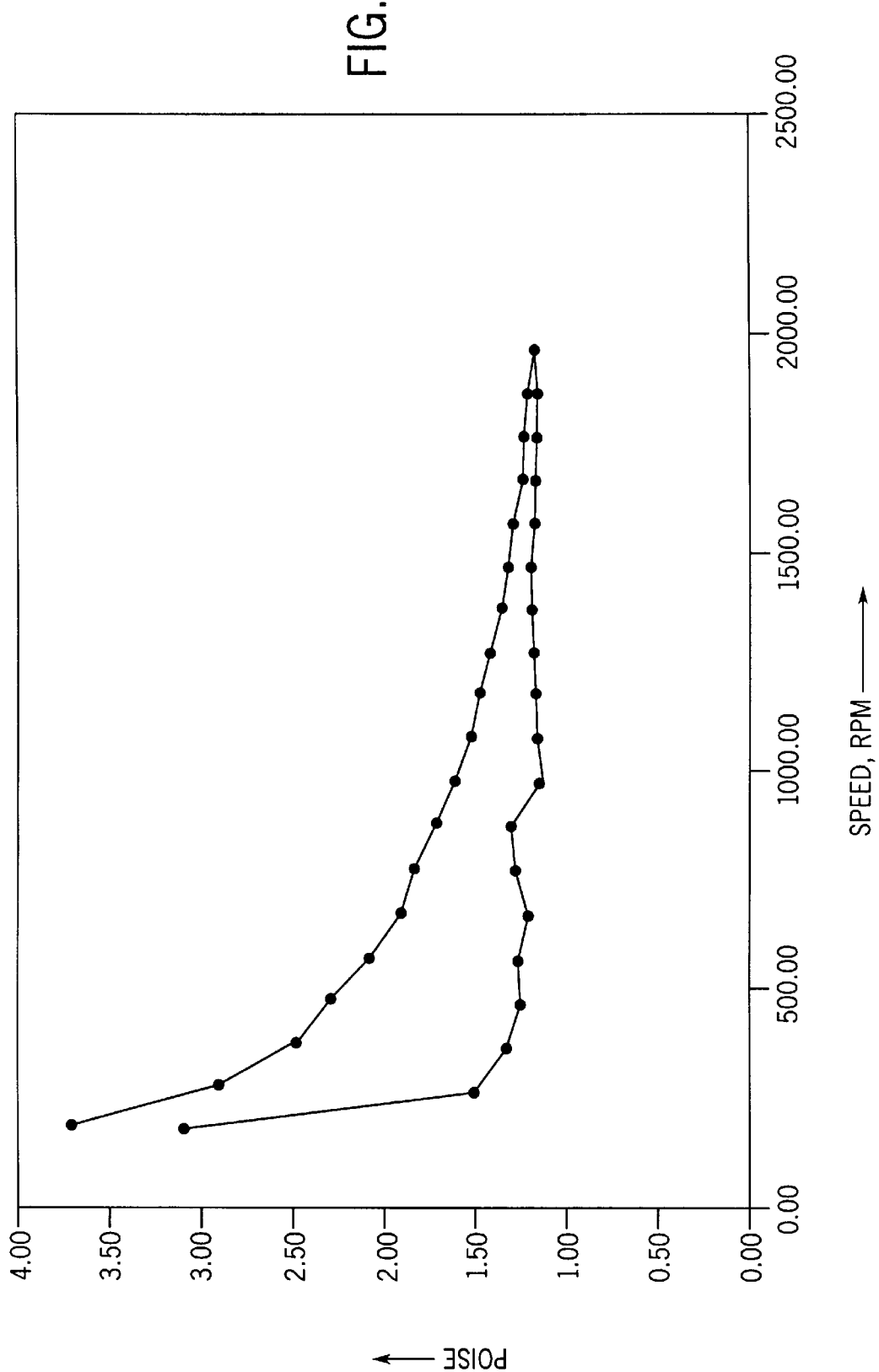
FIG. 7 is the rheology profile for a latex paint prepared with the hydrophilic organoclay thickener as described in Example 1.

The rheology of the paint was examined using a Brookfield, cone and plate viscometer. The viscosity profile of the latex paint is shown in FIG. 7 and displays a well-defined hysteresis which is characteristic of a thixotropic rheology.

The invention also includes organoclays resulting from the novel process, wherein modifying agents are adsorbed and are added at ion exchange sites. A further aspect of the invention includes aqueous compositions containing modified organoclays resulting from the novel process. The organoclays and aqueous compositions may be used in the preparation of food, pharmaceuticals, cosmetics, fire retardants, and various other applications.

While preferred embodiments have been illustrated and described, it should be understood that changes and modifications can be made therein in accordance with one of ordinary skill in the art without departing from the invention in its broader aspects. Various features of the invention are defined in the following claims.

What is claimed is:

1. A process for preparing organoclays for use in aqueous systems, the process comprising the steps of:

crushing clay ore to less than about 100 mesh;

dispersing the clay ore in a polymer-rich phase of an aqueous biphasic extraction system;

adsorbing a polymer onto clay of the clay ore;

mixing the polymer-rich phase containing dispersed clay ore with an aqueous salt solution;

separating the polymer-rich phase from the aqueous salt solution;

recovering organoclay from the polymer-rich phase by a step of flocculation;

washing the organoclay to remove excess polymer; and drying the organoclay.

2. The process of claim 1 wherein the polymer-rich phase of the aqueous biphasic extraction system comprises a solids concentration which produces a smectite-clay concentration of between 2 and 6 weight-percent in the polymer-rich phase of the aqueous biphasic extraction system.

3. The process of claim 1 wherein the aqueous salt solution comprises at least one of sodium carbonate, sodium sulfate and sodium phosphate.

4. The process of claim 1 wherein the polymer-rich phase containing dispersed clay ore is mixed with the aqueous salt solution at room temperature.

5. The process of claim 1 further including the step of mixing the polymer-rich phase containing dispersed clay ore with the aqueous salt solution at an elevated temperature.

6. The process of claim 1 wherein the flocculation is achieved using a polymer having a molecular weight higher than 1 million.

7. The process of claim 1 wherein the organoclay is dried at a temperature below about 110° C.

8. The process of claim 1 wherein the aqueous biphasic extraction system simultaneously converts the raw clay to a sodium form, generates an organoclay, and separates the organoclay from mineral impurities present in the clay ore.

9. The process of claim 1 wherein a mechanical mixer is used to perform the step of mixing the polymer-rich phase containing dispersed clay ore with the aqueous salt solution.

10. The process of claim 1 wherein the clay ore is mixed with the polymer-rich phase for a sufficient length of time to complete conversion of the clay to a sodium form, dispersion of the clay, and modification of surface properties of the clay through polymer attachment.

11. The process of claim 1 wherein the polymer-rich phase is heated to between about 35° C. and 60° C.

12. The process of claim 1 wherein surface properties of the clay are modified through adsorption of polymers in the polymer-rich phase.

13. The process of claim 12 wherein the polymers are low-molecular-weight, water-miscible polymers.

14. The process of claim 12 wherein the polymers are nonionic.

15. The process of claim 12 wherein the process further allows incorporation of additional modifying agents at ion exchange sites subsequent to recovering the organoclay from the polymer-rich phase.

16. The process of claim 15 wherein the additional modifying agent is at least one of quaternary ammonium salts, low-molecular-weight polymers, nonionic surfactants and cationic surfactants.

* * * * *